Patented Sept. 26, 1939

2,174,012

UNITED STATES PATENT OFFICE 2,174,012

PREPARATION OF UREA-FORMALDEHYDE-CONDENSATION PRODUCTS

Sydney Leonard Morgan Saunders, Whetstone, London, and Leonard Winston Coveney, Leytonstone, London, England No Drawing. Application September 14, 1937, Serial No. 163,784. In Great Britain September 28, 1936

9 Claims. (Cl. 260—70)

This invention relates to synthetic resin compositions containing urea-formaldehyde condensation products particularly for use in the manufacture of lacquers and coating compositions.

It is an object of the invention to produce a stable solution of the resinous urea-formaldehyde product in ordinary hydrocarbon varnish solvents which will produce an insoluble film when dried.

In the specification of our prior British Patent No. 442,054 we have described and claimed a process for preparing a synthetic resin composition suitable for incorporation into coating compositions by dissolving or suspending a methylol urea and/or methylol thiourea in an organic solvent containing an alcoholic hydroxyl group in the substantial absence of water adding sufficient anhydrous formaldehyde to bring the total (i. e., free and combined) formaldehyde into excess of that required for the formation of the dimethylol urea and bringing about condensation in the presence of an acid catalyst.

We have now discovered that by continued heating of a primary condensation product of urea and formaldehyde in the presence of formaldehyde and an acid catalyst dissolved or suspended in an alcoholic solvent, resinous compositions may be produced which are considerably soluble in aromatic hydrocarbons and appreciably soluble in aliphatic hydrocarbons. By the term "primary condensation product of a urea or thiourea compound" as used in this specification is meant a condensation product of urea or thiourea and/or derivatives thereof with formaldehyde carried to any point at which the reaction product is still soluble or may be made soluble by prolonged heating in a solvent and includes the methylol urea and methylol thiourea compounds and the anhydride-like products formed therefrom by splitting off water.

According to the present invention a process for preparing synthetic resin compositions comprises heating in the presence of an acid catalyst a primary condensation product of urea and formaldehyde dissolved or suspended in a monohydric alcoholic solvent in the presence of sufficient formaldehyde to bring the total formaldehyde present, in both the free and combined state, into excess of that corresponding to dimethylol urea, and simultaneously or subsequently distilling alcoholic solvent along with any water originally present or formed during the condensation from the resinous product. The duration of the heating will be determined according to the desired solubility in the hydrocarbon solvent which may be easily tested by removing the bulk of the alcohol from a test sample by distillation, and testing the solubility in the required hydrocarbon solvent.

It is not necessary to carry out the reaction according to the present invention in the substantial absence of water. The presence of a certain amount of water obviates the necessity of isolating intermediate products used such as methylol urea, and even if such intermediate products are used as the initial materials, they may be employed in the process of the present invention in a moist condition, because the presence of a small quantity of water enables less acid to bring about their initial dissolution than in the case of the dry materials. Thus, 2.5% of a 5% alcoholic hydrochloric acid is required to cause the dissolution of dry dimethylol urea in butyl alcohol, whereas only 1.5% is required when wet dimethylol urea is used.

We have found that the most satisfactory results are obtained if the reaction is carried out in a vessel heated by a bath maintained between temperatures of 120 and 140° C. but our invention is not limited to these temperatures. The higher the temperature the more rapid is the condensation reaction so that it is less easy to control. The temperature of 140° C. is not intended in any way as a critical limit but at temperatures much above this point decomposition is liable to occur producing discolouration and bringing about such reactions as may seriously affect the utility of the products.

The quantity of formaldehyde to be used is governed by the relative amounts of formaldehyde and urea in the primary condensation products used, and also by the amount and activity of the acid, the greater the amount of acid, the greater the amount of formaldehyde required to control the reaction. For example, using 1.5% of 5% alcoholic hydrochloric acid with dimethylol urea, it is necessary to use ⅛ mol. of formaldehyde to 1 mol. of dimethylol urea, but using 2% of 5% alcoholic hydrochloric acid, it is necessary to use 1 mol. of formaldehyde to prevent gelation on prolonged heating.

It is not necessary to keep the concentration of the acid high once the dimethylol urea or other primary condensation product has dissolved, as this would mean that a proportionately large amount of free formaldehyde would be necessary. Once the dimethylol urea has dissolved the concentration of acid may be brought to the minimum required to prevent decomposition on prolonged heating, such decomposition being in the nature of a degradation with the formation of such products as acetamide and corresponding darkening colour. The maximum amount of acid used is governed by the necessity for an economical use of the excess of formaldehyde.

The acid may be partially or completely neutralised during the distillation but it is essential that the minimum proportion of acid is used during the heating with the solvent.

It is essential to remove any water initially present and that formed by further condensation by distillation of the alcoholic solvent which may be effected conveniently during the process; fresh alcoholic solvent being added from time to time if the quantity present initially is insufficient to complete the removal of water. The distillation of the alcohol brings over water with it, and this distillation may be carried out under atmospheric or reduced or elevated pressures according to the boiling point of the alcohol used.

The heating, in the case where moist materials are used, may be carried out before the distillation to remove water by using a reflux condenser or alternatively heating and distillation may be carried out simultaneously. The refluxing may be conducted at atmospheric or increased pressures according to the solvents used.

Further, the whole of the solvent used may be added at the beginning of the reaction or some may be added in portions or continuously during the reaction. For example, using moist dimethylolurea in butyl alcohol, half the amount of butyl alcohol required may be added at the beginning and the remainder after most of the water has been distilled off, or it may all be added at the commencement and distilled off until all the required quantity of water has been removed.

Any volatile primary or secondary monohydric alcoholic solvent may be used provided that it is capable of forming with water a mixture of substantially constant boiling point and provided that it does not already contain sufficient water or an excess thereof over that required to form a constant boiling mixture. Thus for example, ethyl alcohol forms a constant boiling mixture with water, containing 4.4% water, but the commercially available alcohol—methylated spirits—contains more than 4.4% water and consequently cannot be used. Absolute alcohol, on the other hand, could be used but would necessitate the use of large quantities to ensure efficient dehydration, and, in consequence, would not be commercially practicable.

It is preferable to use those which contain at least four carbon atoms in the molecule and which are substantially insoluble or sparingly soluble in water; and moreover are good dehydrating agents. We have found that butyl alcohol is particularly suitable for the purpose of this invention. Nonvolatile or difficultly volatile monohydric alcohols such, as for example, benzyl alcohol, may be used in conjunction with a lower boiling point alcohol which is sufficiently volatile under the conditions of reaction to allow distillation to be effected.

The acid used as a catalyst may be mineral, such as hydrochloric acid, or organic, such as acetic, oxalic, lactic, phthalic, maleic and the like, but where high solubility in paraffin hydrocarbons is required, it is preferable to use hydrochloric or sulphuric acids.

The invention also includes the addition of resins during any stage of the process providing that at that stage it is soluble in the solvents or mixture of solvents present. The resins may be natural, in which case they may be recent or fossil, raw or processed; or artificial such as phenol formaldehyde resins, chlorinated diphenyl resins or alkyd resins.

The invention further includes lacquers, coating compositions and the like, whenever prepared according to the processes outlined in the preceding paragraphs.

The following examples illustrate the nature of the invention and show the effect of varying the amount and nature of the alcohol and the temperatures and times of heating on the solubility in hydrocarbon solvents:

*Example 1*

75 grms. of paraformaldehyde are dissolved in 1250 ccs. of normal butyl alcohol with the addition of 1 cc. of normal butyl alcoholic potash, by heating at 90° C. for ½ hour in a glycerine bath 9.5 ccs. of 5% alcoholic hydrochloric acid are added, and then 1050 grms. of moist dimethylol urea, containing 600 grms. of dimethylol urea are stirred in. The temperature of the bath is raised to 120° C. and the liquid slowly distilled until 625 ccs. of butyl alcohol have distilled over. A further 625 ccs. of butyl alcohol are added and the distillation continued until a total of 1100 ccs. of butyl alcohol has distilled off, bringing with it a quantity of water. This distillation takes approximately 5 hours. The theoretical volatile matter of the resulting product is approximately 50%, but actual determination gives 15% which shows that a considerable proportion of butyl alcohol has combined with the dimethylol urea condensate.

The product is soluble in xylol and can be diluted to a concentration of 1 pt. of resin in 20 pts. before precipitation occurs.

*Example 2*

The product of Example 1 is heated in a bath at 135° C. for 3 hours under reflux when the solubility is considerably increased yielding a resin which can be diluted in the proportion of 1 pt. resin to 60 pts. of xylol, or 1 pt. resin to 4 pts. white spirit before any signs of precipitation appear.

*Example 3*

75 grms. of paraformaldehyde are dissolved in 1450 ccs. of normal butyl alcohol as before, 9.5 ccs. of 5% alcoholic hydrochloric acid are added, and 1050 grms. of wet dimethylol urea stirred in, and the whole refluxed in a bath at 125° C. for 3 hours. The liquid is then distilled at 120° C. for 3 hours and 130–135° C. for 5 hours, until a total of 710 ccs. of butyl alcohol have been recovered. 1 part of resin may be diluted with 4 parts of xylol or 0.75 part of white spirit.

*Example 4*

150 grms. of paraformaldehyde are dissolved as in Example 3 in 1900 ccs. of normal butyl alcohol, 14.5 ccs. of 5% alcoholic hydrochloric acid are added together with 600 grms. of dry dimethylol urea. The mixture is heated in a bath at 115° C. until all the dimethylol urea is dissolved when it is brought to pH 5.0 approximately with normal butyl alcoholic potash, and then distilled until 1000 ccs. of butyl alcohol have been recovered. The product may be diluted in the proportion of 1 part resin to 3 parts xylol or 0.6 part white spirit.

Example 5

50 grms. of urea are added to 125 ccs. of 40% fomalin and a mixture of sodium acetate and boric acid added to bring the pH value to 5.0. The liquid is then heated at 50° C. for 7 hours, after which 350 ccs. of normal butyl alcohol and 1.3 ccs. of 5% alcoholic hydrochloric acid are added, and distilled off in a bath at a temperature of 130° for 2 hours and at 140° C. for 2½ hours until 340 ccs. of distillate has come over. The final resin can be diluted with 2.5 parts of xylol but it is only slightly soluble in white spirit.

Example 6

The primary condensation product employed may, as already stated, be one which has been carried beyond the dimethylol urea stage. Thus the pasty mass of dimethylol urea prepared from 520 grms. urea and 1300 grms. neutralised formalin is heated at 110° C. for 4 hours with the addition of 5 grms. caustic soda. The liquid is then neutralised and 15 ccs. of 5% alcoholic hydrochloric acid added, together with 70 grms. paraformaldehyde dissolved in 3000 grms. of normal butyl alcohol. The liquid is then distilled in a bath at 130° C. for 4 hours and at 140° C. for 2 hours, until 2600 ccs. of distillate is collected.

The final resin may be thinned with xylol to the extent of 1 part of resin to 1.5 parts of xylol.

Example 7

400 grms. of paraformaldehyde are dissolved in 1800 ccs. of normal butyl alcohol with the addition of 1 cc. or normal aqueous potash. 11.0 ccs. of 5.3% aqueous hydrochloric acid are then added, followed by 1000 grms. of wet mono-methylol urea, containing 665 grms. of mono-methylol urea. The liquid is then distilled in a bath at 120° C. until 1000 ccs. of liquid have distilled, when the temperature is raised to 130° C. and distilled until a further 550 ccs. of distillate has collected. The resin produced may be diluted with 4 parts of xylol before precipitation occurs.

Example 8

40 grms. of paraformaldehyde are dissolved in 1300 ccs. of n-propyl alcohol with the addition of 1 cc. of normal aqueous potash. 5 ccs. of 5% hydrochloric acid are then added together with 500 grms. of wet dimethylol urea containing 300 grms. of dimethylol urea. The liquid is then distilled in a bath at 110° C. until 1100 ccs. of distillate have colected. The resin may be thinned with 4 parts of xylol before precipitation occurs.

Example 9

75 grms. of paraformaldehyde are dissolved in 1800 ccs. of commercial amyl alcohol with the addition of 1 cc. of aqueous potash, and the liquid allowed to stand for ½ hour. 1000 grms. of wet dimethylol urea, containing 600 grms. of dry dimethylol urea, are then added together with 9.5 ccs. of 5% hydrochloric acid. The liquid is then distilled in a bath at 120° C. for 4 hours and 130° C. for 5 hours, until a total of 1200 ccs. of liquid has distilled. The liquid is then evaporated at 80° C. under the pressure of 20 mms. until 230 ccs. more liquid has been recovered. The resin may be diluted with 12 parts of xylol or 2½ parts of white spirit.

Example 10

53 grms. of octodecyl alcohol are dissolved in 680 ccs. of butyl alcohol together with 30 grms. of paraformaldehyde with the aid of 1 cc. of normal potash solution. 3.2 ccs. of 5% hydrochloric acid and 300 grms. of wet dimethylol urea containing 180 grms. of dimethylol urea are added, and the liquid is distilled in a bath at 120° C. for 6 hours and the 135° C. for 5 hours, until a total of 500 ccs. of liquid has distilled. The resin may be diluted with 60 parts of xylol or 9 parts of white spirit without precipitating.

Example 11

100 parts of moist dimethylol urea containing 60 parts of dimethylol urea, together with 10 parts of paraformaldehyde are dissolved in 250 parts of benzyl alcohol with the addition of 1 part 5% alcoholic hydrochloric acid. The liquid is heated at 100° C. for 1 hour and then distilled under reduced pressure until 260 parts of mixed water and alcohol are removed.

1 part of the resin is miscible with 30 parts of xylol.

Example 12

100 parts of moist dimethylol urea as in the last example are dissolved in 200 ccs. of normal butyl alcohol together with 10 parts of paraformaldehyde, 1 part of 5% alcoholic hydrochloric acid and 30 parts of ethylene glycol mono linoleate are added and the mixture heated for ½ hour at 100° C. and then distilled until 220 parts of alcohol and water are distilled off.

1 part of the resin is miscible with 4 parts white spirit or 80 parts xylol, and a film stoved at 130° C. for 1 hour is hard and flexible.

Example 13

100 parts of wet dimethylol urea as used in the last examples are dissolved with 10 parts of paraformaldehyde in 200 parts of n-butyl alcohol with the addition of 1 part of 5% alcoholic hydrochloric acid. 30 parts of linoleic diglyceride, prepared from 95 parts of glycerol and 560 parts linseed oil fatty acids, is heated for 5 hours at 190° C., and the mixture heated for ½ hour at 100° C. and then distilled until 220 parts of distillate has been collected.

The resin stoves to a hard flexible film in 1 hour at 130° C. and is miscible with twice its weight of white spirit.

Example 14

1000 parts of wet dimethylol urea (containing 600 parts dimethylol urea) with 40 parts of paraformaldehyde are heated to 60° C. until clear, and then cooled to 20° C., when 25 parts of a 10% solution of lactic acid in water are added. The liquid is heated to 80° C. for ½ hour, when 1100 parts of normal butyl alcohol and 25 parts of 10% lactic acid solution are added and the heating continued in a bath at 130° C. to remove 550 parts of normal butyl alcohol, bringing with it a quantity of water.

1 part of resin may be diluted with 2.5 parts xylol without precipitation.

What we claim is:

1. A process for preparing a synthetic resin composition which comprises heating in the presence of an acid catalyst a primary condensation product of urea and formaldehyde dispersed in a mono-hydric alcoholic solvent having at least one hydrogen atom attached to the hydroxyl carbon in the presence of sufficient formaldehyde to bring the total formaldehyde present in both the free and combined state into excess of that corresponding to dimethylol urea, and distilling off alcoholic solvent along with water, both any originally present in the reaction ingredients and that formed during the condensation reaction; the said heating being continued until the product is soluble in hydrocarbon solvents and the acidity of the alcoholic solvent being maintained throughout the heating.

2. A process for preparing a synthetic resin composition which comprises heating in the presence of an acid catalyst a primary condensation product of urea and formaldehyde dispersed in a mono-hydric alcoholic solvent having at least one hydrogen atom attached to the hydroxyl carbon in the presence of sufficient formaldehyde to bring the total formaldehyde present in both the free and combined state into excess of that corresponding to dimethylol urea, and simultaneously distilling alcoholic solvent and adding more alcoholic solvent until both the water originally present in the reaction ingredients and that formed during the condensation reaction is removed; the said heating being continued until the product is soluble in hydrocarbon solvents and the acidity of the alcoholic solvent being maintained throughout the heating and distillation.

3. A process as claimed in claim 1, wherein the product after distilling alcoholic solvent therefrom is further heated with the aid of a reflux condenser to increase solubility in hydro-carbon solvents.

4. A process for preparing a synthetic resin composition which comprises reacting in the presence of an acid catalyst in a vessel heated by a bath maintained at a temperature of 120-140° C., a primary condensation product of urea and formaldehyde dispersed in a monohydric alcoholic solvent having at least one hydrogen atom attached to the hydroxyl carbon in the presence of sufficient formaldehyde to bring the total formaldehyde present in both the free and combined state into excess of that corresponding to dimethylol urea, and distilling off alcoholic solvent along with water, both any originally present in the reaction ingredients and that formed during the condensation reaction; the said heating being continued until the product is soluble in hydrocarbon solvents and the acidity of the alcoholic solvent being maintained throughout the heating.

5. A process for preparing a synthetic resin composition which comprises heating until further condensation occurs in the presence of an acid catalyst a primary condensation product of urea and formaldehyde dispersed in a monohydric alcoholic solvent having at least one hydrogen atom attached to the hydroxyl carbon which has a boiling point below the temperature at which the reaction is carried out in the presence of sufficient formaldehyde to bring the total formaldehyde present in both the free and combined state into excess of that corresponding to dimethylol urea and at sufficient pressure to enable the condensation temperature to be reached, and subsequently distilling off alcoholic solvent along with water, both any originally present in the reaction ingredients and that formed during the condensation reaction; the said heating being continued until the product is soluble in hydrocarbon solvents and the acidity of the alcoholic solvent being maintained throughout the heating.

6. A process for preparing a synthetic resin compound which comprises heating in the presence of an acid catalyst a primary condensation product of urea and formaldehyde dispersed in a monohydric aliphatic alcohol having at least one hydrogen atom attached to the hydroxyl carbon and at least four carbon atoms in the molecule, in the presence of sufficient formaldehyde to bring the total formaldehyde present in both the free and combined state into excess of that corresponding to dimethylol urea, and distilling off alcoholic solvent along with water, both any originally preesnt in the reaction ingredients and that formed during the condensation reaction; the said heating being continued until the product is soluble in hydrocarbon solvents and the acidity of the alcoholic solvent being maintained throughout the heating.

7. A process for preparing a synthetic resin composition which comprises heating in the presence of an acid catalyst a primary condensation of urea and formaldehyde dissolved in butyl alcohol in the presence of sufficient formaldehyde to bring the total formaldehyde present in both the free and combined state, into excess of that corresponding to dimethylol urea, and distilling off alcoholic solvent along with water, both any originally present in the reaction ingredients and that formed during the condensation reaction; the said heating being continued until the product is soluble in hydrocarbon solvents and the acidity of the alcoholic solvent being maintained throughout the heating.

8. A process as claimed in claim 1, wherein the alcohol employed is one which is not volatile at the reaction temperature and any water originally present and that formed during the condensation reaction is removed by adding a sufficient quantity of a lower boiling point alcohol to bring the distillation temperature below the desired reaction temperature and distilling off mixed alcohol solvent.

9. A process as claimed in claim 1, wherein the primary condensation product of urea and formaldehyde is formed in aqueous solution in the presence of an acid catalyst and the alcohol solvent is added without separating the primary urea condensation product along with further acid catalyst and the product is then heated in the presence of the alcohol solvent.

SYDNEY LEONARD MORGAN SAUNDERS.
LEONARD WINSTON COVENEY.